United States Patent Office 3,201,976
Patented Aug. 24, 1965

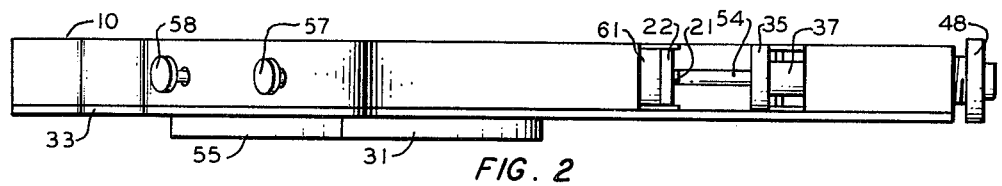
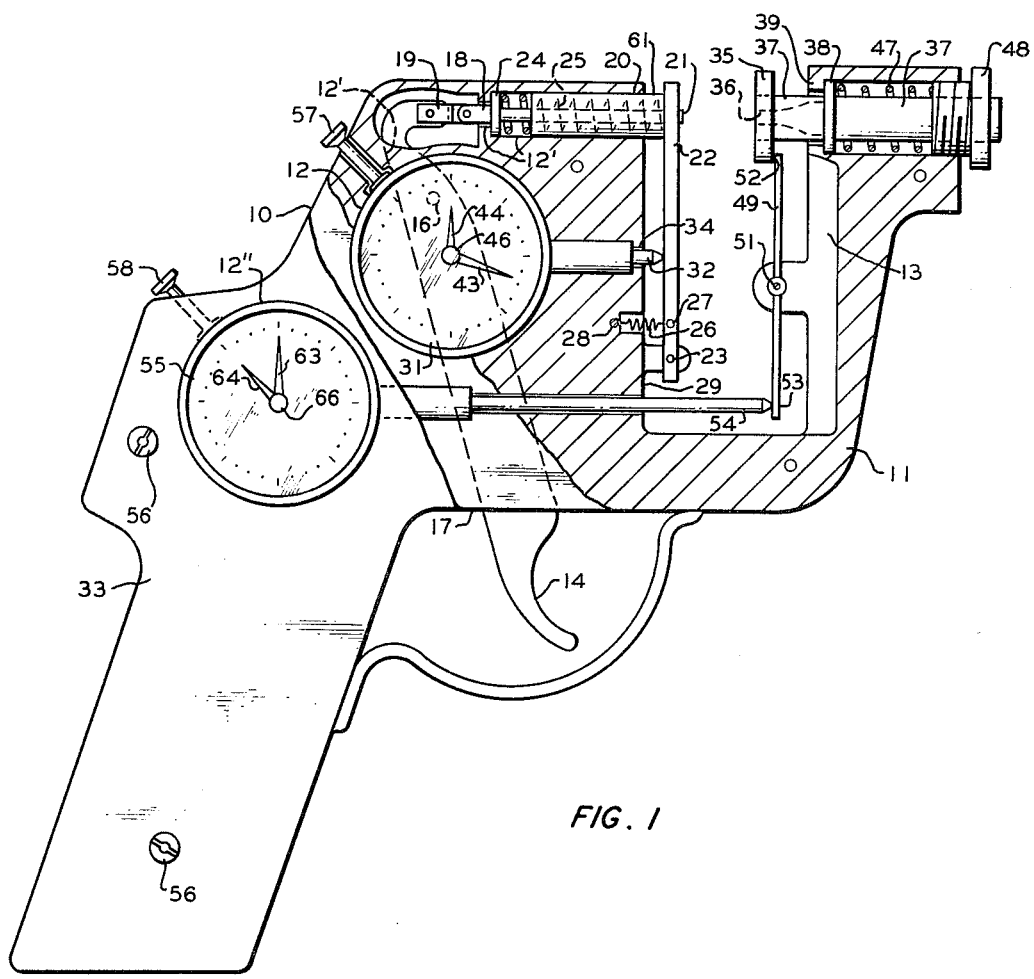

3,201,976
METHOD AND APPARATUS FOR DETERMINING THE TENDERNESS OF MEAT
Delbert Starrett, 3600 Price Road, Bartlesville, Okla., and Charles H. Adams, Lincoln, Nebr.
Filed Jan. 31, 1962, Ser. No. 173,319
5 Claims. (Cl. 73—81)
(Filed under Rule 47(a) and 35 U.S.C. 116)

The invention here disclosed relates to a method for determining the tenderness of meat. In another aspect, it relates to an improved method for determining the tenderness of meat of live animals. In still another aspect, it relates to an apparatus for measuring the thickness and pressure required to penetrate a section of an animal's cartilage such as an ear section.

In the raising of livestock for subsequent butchering and consumption, it is important to know that the quality of the animal is such that the various cuts of edible meat which will be available will be tender and of the type that will bring premium prices. It is generally well-known that in the meat business heretofore the tenderness of a piece of meat has been generally tested by the butcher or customer grasping the meat between the thumb and first finger and applying pressure to the meat. As the sense of touch and the judgment to the tenderness of meat is not exactly the same with all individuals, some might say a certain piece of meat was tender, others might judge the same piece of meat to be very tender, while still others might say the same piece of meat was only medium tender. Thus, accuracy of judgment varies between different individuals.

Also, this method of testing is applicable only to butchered meat. More recently, attempts have been made to measure the quality of beef on-the-hoof by sound waves. An ultrasonic device is used to beam sound waves into a live animal and measurement of the speed of their return by complicated electronic instruments indicates the thickness of the fat. However, this method of measurement is expensive, requiring complicated electronic instruments and it does not provide a measurement of the true tenderness of the meat. Instead it gives only a rough measurement of the thickness of the fat layer at only the point of measurement.

Therefore, to overcome the shortcomings of these methods and to obtain a direct measurement of the quality of meat on the hoof, I have discovered a method for determining the quality of live meat by measuring the relationship between meat tenderness and the tensile strength of its connecting tissue through use of an apparatus that measures the thickness of and pressure required to penetrate a section of the animal's cartilage such as an ear section.

The general object of this invention is to provide a simple method for testing the solidity or tenderness of a piece of meat. Another object is to provide a method for determining the solidity or tenderness of meat-on-the-hoof. A further object of the invention is to provide a simple, inexpensive and easily operated device for testing the solidity or tenderness of a piece of meat. A still further object of the invention is to provide a meat testing device, including visual means indicating the solidity of meat viewable to the owner or customer. A still further object of the invention is to provide a meat testing device including means to apply a shearing or puncturing effect to a section of an animal to determine the tensile strength of the animal's connecting tissue as an indication of the quality of the meat of the entire animal.

My novel device is adapted to test meat for tenderness whereby the owner or intended purchaser of the livestock will know whether the animal will, upon being butchered, provide cuts of meat which are tender or if the animal is one which would require additional conditioning for its meat to become tender.

Other objects, advantages and features of my invention may appear from the accompanying drawing, the subjoined detail description, and the appended claims.

The accompanying drawings illustrate the invention in one of the forms I at present deem preferable.

FIGURE 1 is an elevation partially in cross section of the device of the invention.

FIGURE 2 is a plan view of the device of the invention.

Referring now to the drawings wherein like numerals denote like elements, the invention will be more fully explained. As shown in FIGURE 1, the device comprises a generally vertically disposed frame 10, having an arm 11 projecting from and supported by said frame. As shown, said arm 11 is integral with frame 10. However, it will be realized that said arm can be separate from said frame and suitably attached thereto. Frame 10 and arm 11 are conveniently made from a solid bar of material and are provided with cavities 12 and 13, respectively, which are routed out of the solid bar. Of course, said frame 10 and arm 11 can be cast and a suitable mold employed to form said cavities. Trigger lever 14 is pivotly mounted at pintle point 16 within cavity 12' and extends without said cavity through an opening 17 provided in the bottom of arm 11. A push rod 18 is horizontally and slidably disposed within said cavity 12'. A first link 19 pivotly connects said trigger lever 14 and one end of said push rod 18. Rod 18 entends horizontally forward passing through opening 20 in wall 29 of cavity 12' to expose shear member 21. In registry with shear member 21 is a lever member 22 that is pivotly mounted at pintle point 23 at a point spaced apart from shear member 21 said lever member 22 having an opening through which push rod 18 can slide to project member 21 forward and out of registry with lever member 22 when said lever member is acted upon by an external force as hereinafter explained. Mounted concentrically around push rod 18 and anchored at point 24 is compression spring 25. The end of spring 25 enclosed in loose fitting guide member 61 extends through opening 20 and bears against lever member 22 to keep said lever member in registry with shear member 21, when said shear member is forced forward. Forward movement of lever member 22 is arrested by tension spring 26 fastened at point 27 above pintle point 23 of said lever member and point 28 in wall 29 that counterbalances the compressive force of spring 25 so that said lever member remains in registry with shear member 21 unless acted upon by an external force. Spring 26 is provided to normally hold trigger 14, push rod 18 and lever member 22 in the position shown when force is released from trigger lever 14.

Indicating gauge 31 having push rod 32 extending therefrom is mounted in cavity 12 of frame 10 with its dial protruding from an opening in the cover plate 33. Said push rod 32 is horizontally and slidably disposed partially within said cavity 12 and extending through an opening 34 in wall 29 of cavity 12 to abut against lever member 22. Indicating gauge 31 is of the maximum registering type and is of known or conventional construction and per se forms no part of the invention. One suitable type of indicating gauge is that manufactured by the Federal Products Corporation, 1144 Eddy Street, Providence, R.I., and illustrated in their catalog No. 60 as Model B–81. The gauge can be used as purchased, but is preferably modified as shown in FIGURE 1 to provide a minimum reading needle 43 having an intermediate offset portion which registers with needle 44, which in turn is actuated by means of spindle shown, which is connected to rod 32 internally of the gauge casing. Minimum reading needle 43 can be manually moved or reset by means of knob 46.

Referring to FIGURE 1, die member 35 having opening 36 to receive shear member 21 is threadedly mounted on hollow compression rod 37 that extends horizontally through the upper extension of arm 11. A washer 38 rigidly affixed to the exterior of said compression rod restricts movement of rod 37 toward the shear member 21 by abuting against flange 39. A compression spring 47 fits concentrically around compression rod 37 and abuts against washer 38 and a collar member 48 that screws into the end of arm 11. Makeup of said collar member increases the compression of spring 47, permitting calibration of the device as later explained.

As shown in FIGURE 1, a lever member 49 is generally vertically disposed being pivotally mounted at pintle point 51 within cavity 13. The upper end 52 of lever member 49 abuts the lower back side of die member 35 and the lower end 53 of lever member 49 abuts horizontally and slidably disposed push rod 54 of indicating gauge 55. Indicating gauge 55 is mounted in cavity 12" of frame 10 with its dial protruding from an opening in cover plate 33. Indicating gauge 55 is of the maximum registering type and is of known or conventional construction and per se forms no part of the invention. One suitable type of indicating gauge is that manufactured by the Federal Products Corporation, 1144 Eddy Street, Providence, R.I., and illustrated in their catalog No. 60 as Model B–81. The gauge can be used as purchased, but is preferably modified to provide a maximum reading needle 63 having an intermediate offset portion which registers with needle 64, which in turn is activated by means of spindle shown which is connected to rod 54 internally of the gauge casing. Maximum reading needle 63 can be manually moved or reset by means of knob 66.

Cover plate 33, held in place by screws 56, is adapted to fit frame 10 and arm 11 with circular portions removed to expose the faces of indicating gauges 31 and 55.

The measuring mechanism of the device can be properly calibrated by depressing trigger 14 until the free end of lever member 22 touches the face of die member 35. When lever member 22 is in this position, indicating gauge 31 is adjusted by means of screw adjustment 57 to register zero. When trigger 14 is not depressed, gauge 31 will indicate the maximum measurement.

The shearing mechanism of the device can be properly calibrated by placing a section of thin brass shim stock or some other material that requires a known shear force to remove a section the size of the face of shear member 21 and adjusting the compression of spring 47 by tightening or loosening collar 48 until the known shear force is registered on indicator gauge 55 when trigger 14 is depressed to force shear member 21 through the test material and into opening 36 of die member 35. In practice, the dial of indicating gauge 55 is graduated in pounds per square inch and its range and measuring increments are dependent upon the size of shear member 21. Minor adjustment to assure slight contact between push rod 54 of indicator gauge 55 and lower end 53 of lever member 49 when shear member 35 is at rest is obtained by means of screw adjustment 58 of said indicator gauge.

In operation, a meat section to be tested is placed within the opening between shear member 21 and die member 35 and force is applied manually to trigger 14. Said force is transmitted through push rod 18 and is exerted upon the material being tested through shear member 21. As shear member 21 presses forward, lever member 22 moves with it until said shear member meets the meat section. At that time, lever member 22 stops providing a measurement of the thickness of the section on gauge 31 and the shearing member 21 is pressured on through the meat section providing a maximum force reading on gauge 55.

The device of the invention can be fabricated from any convenient material. One presently preferred material for frame 10 and arm 11, because of its light weight, relatively great strength, and ease of machining, is aluminum. The various parts such as trigger lever 14, push rod 18, shear member 21, lever members 22 and 49, die member 35 and compression rod 37 can be preferably made from any suitable stainless steel. Tension spring 26 and compression springs 25 and 47 can be made of any suitable spring steel. The device of the invention may incorporate a hydraulic or any other type system to force the shearing member into or through the meat section being graded. It is apparent that the device is compact, rugged, and can be conveniently carried in an average tool kit or on the person of the user. The dimensions of the device being of the general shape of the automatic pistol facilitate carrying the device in a holster as an ordinary pistol is carried.

The device can be employed for testing and grading any form of meat that can be placed between shear member 21 and die member 35. When testing ear sections, it is a preferred practice according to this invention to employ an indicating device 31 having a dial range measuring from zero to 10 millimeters and an indicating device 55 having a dial range equivalent to from 0 to 100 pounds of force. Gauge 55 can be calibrated to yield a direct reading of pounds per square inch of force required to penetrate the section of meat. For example, shear member 21 may be 0.3 inch in diameter with its mating die member 35 having opening 36 slightly larger so that said shear member will not stick in said die opening. Force required to puncture the cartilage of ear sections varied from 120 pounds per square inch to 255 pounds per square inch with the thickness of the ear sections ranging from 2.5 to 5.5 millimeters. It is clear that spring 47 or indicating devices 31 and 55 may be changed to accommodate any desired range of force or measurement. Testing of a single sample of meat such as an ear section of an animal with the device of this invention has been found to yield an indication of the tenderness or solidity of the entire supply of edible meat from the animal.

In practice, measurements taken with the device of this invention are plotted on graph paper to yield a family of curves with meat quality being the parameter and meat thickness and the force required to puncture or shear said meat thickness being the variables. Thus, with said curves one can take a single reading with the device of this invention and by plotting the thickness of the meat section versus the force required to puncture or shear said meat section on the aforementioned graph, by comparison with the reference curves he can immediately ascertain the tenderness or quality of the tested meat section and the whole animal whose section was tested.

It is particularly noted that the force applying mechanism comprising trigger lever 14, push rod 18, shear member 21, and die member 35 is completely segregated from the force indicating mechanism, i.e., the force is not measured until it has actually been applied to the material being tested. In other words, the applied force must be transmitted to and through the material being tested. Also, it is realized that shear member 21 may be tapered to yield a measurement of the force required to spread apart or tear the cartilage or connecting tissue of the meat section. Shear member 21 and cooperating die hole 36 may have any configuration or shape without departing from this invention and the device may be in any physical form and may have its indicating dials on any side of frame 10.

Various other modifications of the invention will be apparent to those skilled in the art in view of the above disclosure and the drawings and are believed within the scope of the invention.

I claim:

1. Apparatus for determining the tenderness of meat comprising: a frame; an arm projecting from said frame; a movable push rod horizontally and slidably disposed in said frame and having a shearing member attached thereto; a die member disposed in said projecting arm spaced from said shear member in line with said shear member and adapted to receive said shear member; a first lever member vertically disposed and hinged to said frame with the free end of said lever member in substantial registry with said shear member; a first compression spring disposed around said shear member and bearing against said first lever member to urge said lever member forward; a tension spring suitably located to restrict forward movement of said lever member until said shear member is urged in the direction of said die member; a hollow compression rod slidably disposed in said arm having said die member threadably attached to receive said shear member; a second compression spring disposed about said compression rod to urge said die member toward said shear member; a restrictive member to bear against a flanged portion of said arm to limit movement of said die member toward said shear member; a collar member threadedly attached to said arm to restrict said second compression spring; means connected to said shear member for urging said shear member toward said die member; means operatively connected to said lever member to indicate the thickness of a meat section placed between said shear member and said die member; and means operatively connected to said die member to indicate the force required to perforate said meat section with said shear member.

2. The apparatus for determining the tenderness of meat of claim 1 in which said shear member is pointed.

3. The apparatus for determining the tenderness of meat of claim 1 in which said shear member has a circular cross section with a diameter in the range of 0.1 to 0.5 inch.

4. A method for determining the tenderness of edible portions of meat of a live animal which comprises applying sufficient pressure across an area of one ear of said live animal to shear the entire thickness of the area of the ear; measuring the pressure required to shear the ear section; measuring the thickness of the ear section sheared; and comparing the pressure and thickness values with such values of ear sections of animals of known edible meat tenderness.

5. A method for determining the tenderness of edible portions of meat of a live animal which comprises applying sufficient pressure across an area of an ear of said live animal to shear the entire thickness of the area of the ear; measuring the pressure required to shear the ear section; and measuring the thickness of the ear section sheared.

References Cited by the Examiner

UNITED STATES PATENTS

| | | | |
|---|---|---|---|
| 2,466,567 | 4/49 | Williams | 73—81 |
| 2,496,627 | 2/50 | Johnston | 73—102 |
| 2,976,723 | 3/61 | Eddy | 73—81 X |
| 3,078,710 | 2/63 | Palmer | 73—81 |

OTHER REFERENCES

ASTM Standards 1961, Part II, page 279.

Ingalls, Albert G.: What is Hardness?, in Scientific American, September 1943, pp. 109–111.

Tenderness of Meat Gets Accurate Test, in Popular Science Monthly, August 1930, p. 48.

RICHARD C. QUEISSER, *Primary Examiner.*

DAVID SCHONBERG, *Examiner.*